June 2, 1925.  1,540,041
H. G. TATOSIAN
MACHINE FOR BAKING SUGAR CONES
Filed May 29, 1923  5 Sheets-Sheet 5

INVENTOR.
Harry G. Tatosian
BY
Chamberlain & Newman
ATTORNEYS.

Patented June 2, 1925.

1,540,041

UNITED STATES PATENT OFFICE.

HARRY G. TATOSIAN, OF BRIDGEPORT, CONNECTICUT, ASSIGNOR, BY MESNE ASSIGNMENTS, TO ICE CREAM CONE MACHINERY, INC., OF BRIDGEPORT, CONNECTICUT, A CORPORATION OF CONNECTICUT.

MACHINE FOR BAKING SUGAR CONES.

Application filed May 29, 1923. Serial No. 642,201.

*To all whom it may concern:*

Be it known that HARRY G. TATOSIAN, a citizen of the United States, and resident of Bridgeport, in the county of Fairfield and State of Connecticut, has invented certain new and useful Improvements in Machines for Baking Sugar Cones, of which the following is a specification.

The present invention relates to an improved machine for making pastry cakes, such as are used for ice cream cones, the cakes being rolled into cone-shape, immediately after they are baked in the present machine. A machine for performing this cone rolling operation is disclosed in my U. S. Patent #1,440,851 of December 5, 1922.

An object of the invention is to provide a machine in which such cakes may be made automatically and with relatively great speed and uniformity.

A further object is to provide a machine in which a great number of cakes may be baked simultaneously, the machine occupying a relatively small area, so that within a restricted space a large production of the cakes may be accomplished. To this end it is proposed to provide continuous conveying means for the cake-molds having superimposed reaches.

Another object is to provide speed control means so that the baking of the cakes may be accurately regulated.

A still further object is to provide an improved batter feed device which will accurately measure the batter supplied for each cake, and which will be synchronized with the movement of the baking molds.

With the above and other objects in view an embodiment of the invention is shown in the accompanying drawings, and this embodiment will be hereinafter more fully described with reference thereto, and the invention will be finally pointed out in the claims.

In the drawings.

Similar reference characters indicate corresponding parts throughout the several figures of the drawings.

Figure 1:
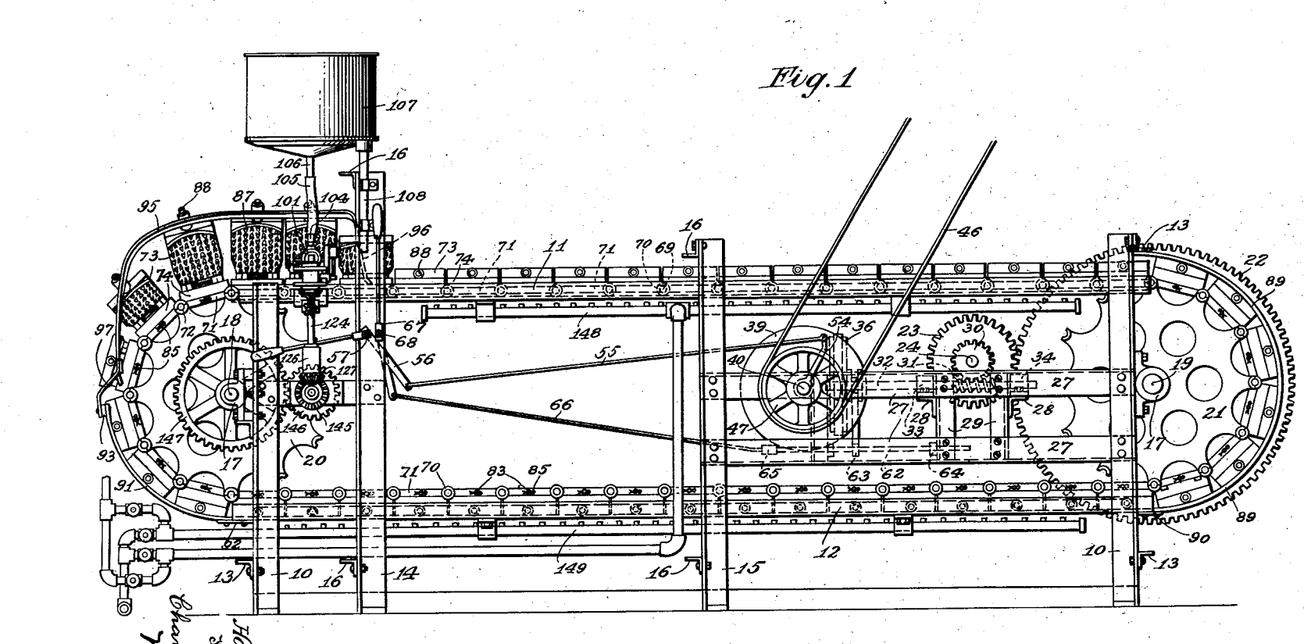
Fig. 1 is a front elevation of a cake baking machine in accordance with the present embodiment of the invention.

Referring particularly to Fig. 1 of the drawings, the frame of the machine comprises angle-bar uprights 10 at each end, and upper and lower horizontally disposed longitudinal angle-bars 11 and 12 at each side, and transverse horizontal bars 13. Intermediate uprights 14 and 15 connected by transverse bars 16 are also provided, the uprights 15 being relatively near the left hand end of the machine and extending above the upper horizontal bars 11 while the uprights 15 are substantially in the center of the machine and have their upper ends flush with said upper horizontal bars.

Upon each of the uprights 10 there are secured bearings 17 in which are journalled the conveyor sprocket shafts 18 and 19, and upon which pairs of spaced sprocket wheels 20 and 21 are supported, and upon which the continuous conveyors are carried.

Figure 2:
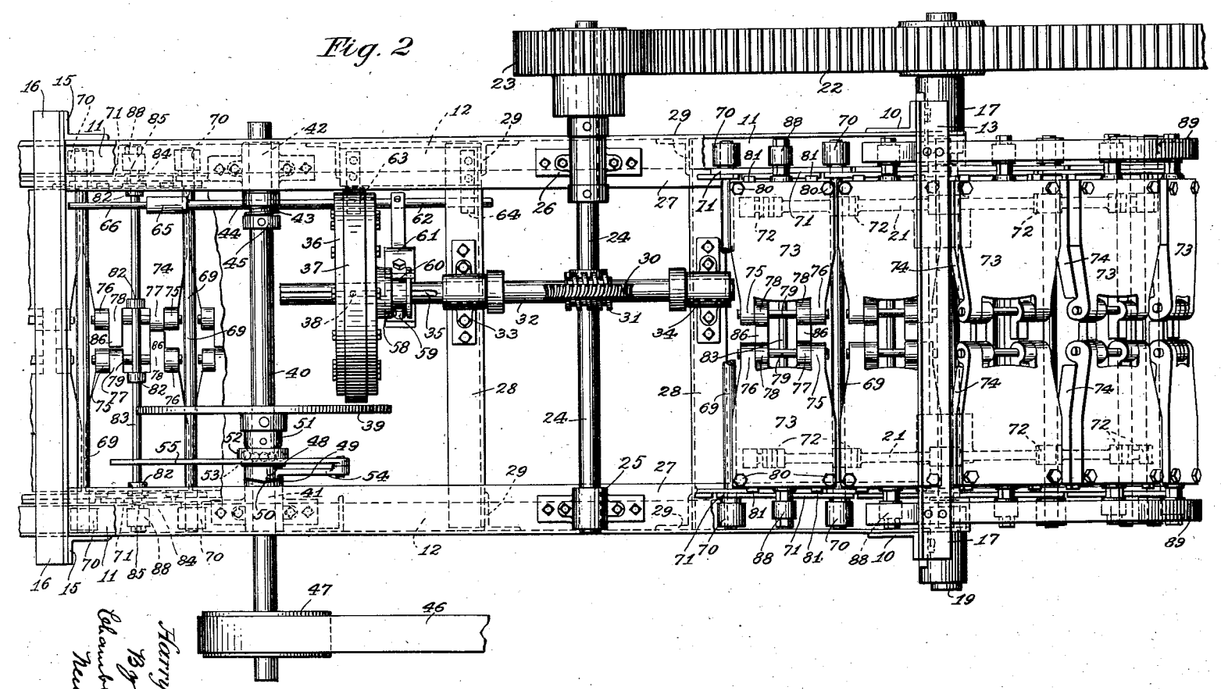
Fig. 2 is an enlarged plan view of the right-hand end of the machine, a portion of the upper reaches of the conveyor being broken away to show the drive mechanism.

A large gear 22 is provided on the projecting end of the shaft 19, and meshes with a pinion 23 provided upon the end of a shaft 24, journalled upon bearings 25 and 26 supported upon a frame work comprising longitudinal angle bars 27 connected within the right hand uprights 10 and the uprights 15, transverse angle bars 28 connected between the bars 27, and upright angle bars 29 also connected between the bars 27. A worm gear 30 is provided on the shaft 24 and meshes with a worm 31 provided on a longitudinal shaft 32 journalled in bearings 33 and 34 provided upon the bars 28, and projecting outwardly from the right-hand bar, the projecting portion having a key slot 35 therein, and having mounted thereon a wheel 36 having a frictional gripping peripheral surface 37 of leather or the like. The wheel 36 is keyed upon the shaft 32 by means of a key 38 engaging the key-slot and is slidable longitudinally of the shaft, to shift its engaging position between the center and periphery of a friction drive disk 39, mounted upon a shaft 40 journaled in bearings 41 and 42, to thereby vary the speed of rotation of the gear 22 as desired, and hence the speed of movement of the conveyor carried by the sprockets.

The shaft 40 is longitudinally shiftable in its bearings, a spring 43 disposed between a loose collar 44 in contact with the bearing 42 and a collar 45 fixed to the shaft, adapted to shift the shaft longitudinally to space the disk 39 from the friction wheel, and in which position the machine is stationary.

The shaft 40 is continuously rotated by a belt 46 driven from a motor (not shown) and extending over a pulley 47 on the end of the shaft.

In order to shift the shaft against the force of the spring 43 and engage the disk 39 with the friction wheel, a loose collar 48 is mounted on the shaft adjacent the bearing 41, being provided with diametrically opposite cam projections 49 which engage correspondingly shaped recesses 50 in the inner end of the bearing. Between the collar and the disk there is provided a cone sleeve 51 fixed to the shaft and an annular cup member 52 loose upon the shaft, and having anti-friction balls 53 therein which engage the cone. The collar 48 is provided with a radial arm 54, connected by a rod 55 to a bell crank control lever 56, pivoted at 57 upon the upright 14. Upon operating the lever 56 to turn the collar 48 upon the shaft the cam projections 49 are turned into engagement with the projected or convex portions at the end of the bearing 41 and thereby the shaft 40 is shifted and the disk 39 engaged with the wheel 36, the machine being then in motion.

In order to change the position of the wheel 36 and thereby its speed of rotation, the same is provided with an annular channel 58 in its hub engaged by the diametric rollers 59 and 60 of a yoke arm 61, mounted upon slide rod 62 slidably supported in apertured guide blocks 63 and 64 secured to the frame; the end of the rod being swivelly connected at 65 to a rod 66, extending to a bell crank lever 67 pivotally mounted at 68 upon the uprights 14, and in proximity to the bell crank lever 56. By turning the lever 67 the wheel 37 may be shifted in either direction and to any desired extent, and the speed of the machine thereby regulated.

Figure 5:
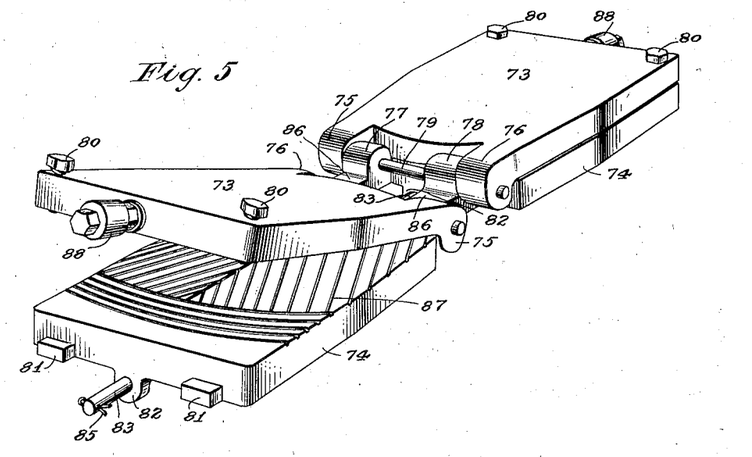
Fig. 5 is a perspective view of a pair of the baking molds.

The conveyor for the baking irons comprises a series of spaced shafts 69 provided at their ends with rollers 70, and connected by links 71 adjacent the rollers. The shafts 69 engage radial pockets 72 of the sprockets as the conveyor moves about the same, while the rollers 70 ride upon the upper angle bars 11, which form tracks therefor, during the movement along the upper reach of the conveyor. The baking irons are mounted in pairs between each pair of the shafts 69, the respective irons of each pair being opposed to each other.

Figures 6, 7, 8, 9, 10:
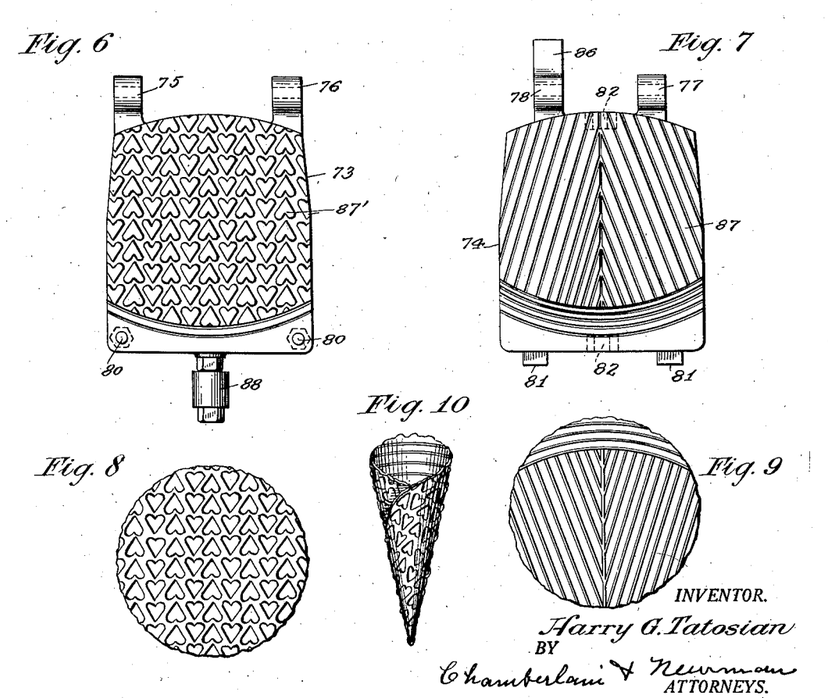
Fig. 6 is a plan view of the inner side of the upper section of a baking mold.
Fig. 7 is a similar view of the lower section.
Fig. 8 is a plan view of one of the cakes adapted to be baked in the machine.
Fig. 9 is a similar view showing the opposite side of the cake.
Fig. 10 is a perspective view showing the manner in which the cake is substantially rolled into cone-form.

The irons consist of upper and lower sections 73 and 74 having over-lapping aligned apertured lugs 75 and 76, and 77 and 78, respectively connected by a pintle shaft 79, so that the sections may be opened and closed in the manner of a book. The lower section is provided in its forward corners with a pair of adjustable contact screws 80 having their heads exposed at the upper side and projecting slightly at the under side to space the inner surfaces of the sections from each other. The lower section is provided at its lower edge with a pair of projecting lugs 81, adapted to rest upon the links 71 of the conveyor.

Upon the under surface the lower section is provided adjacent its inner and outer edges with a pair of apertured lugs 82 through which a central mounting rod 83 extends, the extremities of this rod extending through apertures 84 provided centrally of the links 71, and being secured against longitudinal movement by cotter pins 85. The outer lugs 82 engage the links of the conveyor to prevent outward longitudinal movement of the irons, while the apertured lugs 78 of the lower sections are provided with an integral projecting finger 86, which engages the apertured lug 77 of the other and opposed lower section, to maintain the spaced relation of the irons. The inner surfaces of the irons are provided with a grooved design, the lower section having a design as indicated by the reference character 87, while the upper section has another design as indicated by the reference character 87', and which designs are imparted to the baked cake in the form of ribs. The upper sections are provided at their outer ends with projecting rollers 88, adapted to co-operate with means hereinafter described, to open and close the arm, and during the movement of the conveyor along the lower reach to ride upon the lower angle bars 12, these bars forming tracks.

Semi-circular retaining bars 89 extend about the outer half of the sprockets 21 at each side and are secured at their ends to the upper transverse bar 13 and a lower transverse bar 90, the latter being secured to the ends of the angle bars 12; these bars 89 being adapted to engage the rolls 88 and thereby maintain the irons closed as they move from the upper tracks formed, by the angle bars 11 to the lower tracks formed by the bars 12.

As the conveyor is carried by the sprockets 20 from the lower reach to the upper reach, the irons are adapted to be opened for the purpose of permitting the removal of the baked cakes.

Figure 3:
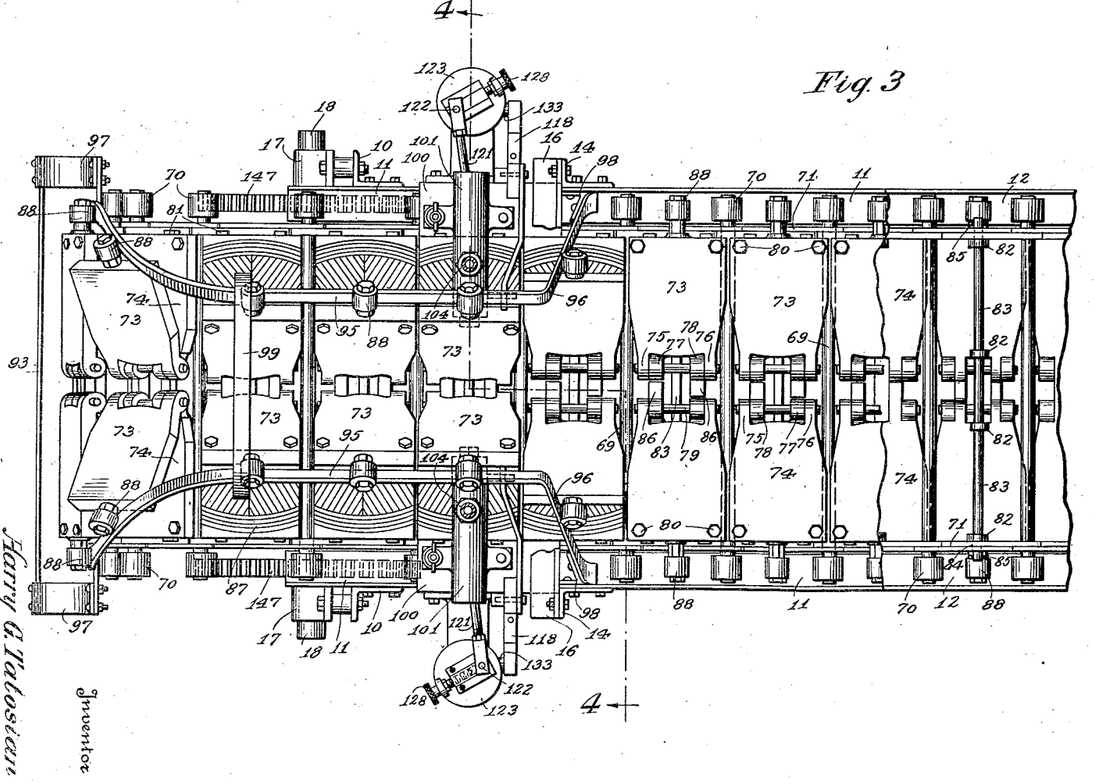
Fig. 3 is a similar plan view of the left hand end of the machine and showing the batter feed mechanism.

For this purpose arcuate bars 91 connected at their lower ends by a transverse bar 92, are secured to the ends of the angle bars 12 and extend partially about the sprockets forming a continuation of the lower tracks for maintaining the irons closed during the first half of their upward movement about the sprockets. The bars 91 are supported at their upper ends by a transverse bar 93 and arcuate strut bars 94 connected between the transverse bar 13 and said bar 93.

Cam rails 95 at each side extend from a point adjacent the upper ends of the bars 91 and at the under side of the line of the rollers 98, to the uprights 14 where they are provided with a sharp drop 96. These rails are supported at their outer ends by struts 97 secured to the transverse bar 93, and at their inner ends by corner bracket 98 secured to the uprights 14, and are braced intermediately by a cross bar 99 connecting them.

As the rollers 88 leave the bars 91 they ride upon the cam rail 95 so that the upper sections 73 of the irons are raised or opened relatively to the lower sections, being again closed as the rollers ride down the decline portions 96 of the cam rails.

Figure 4:
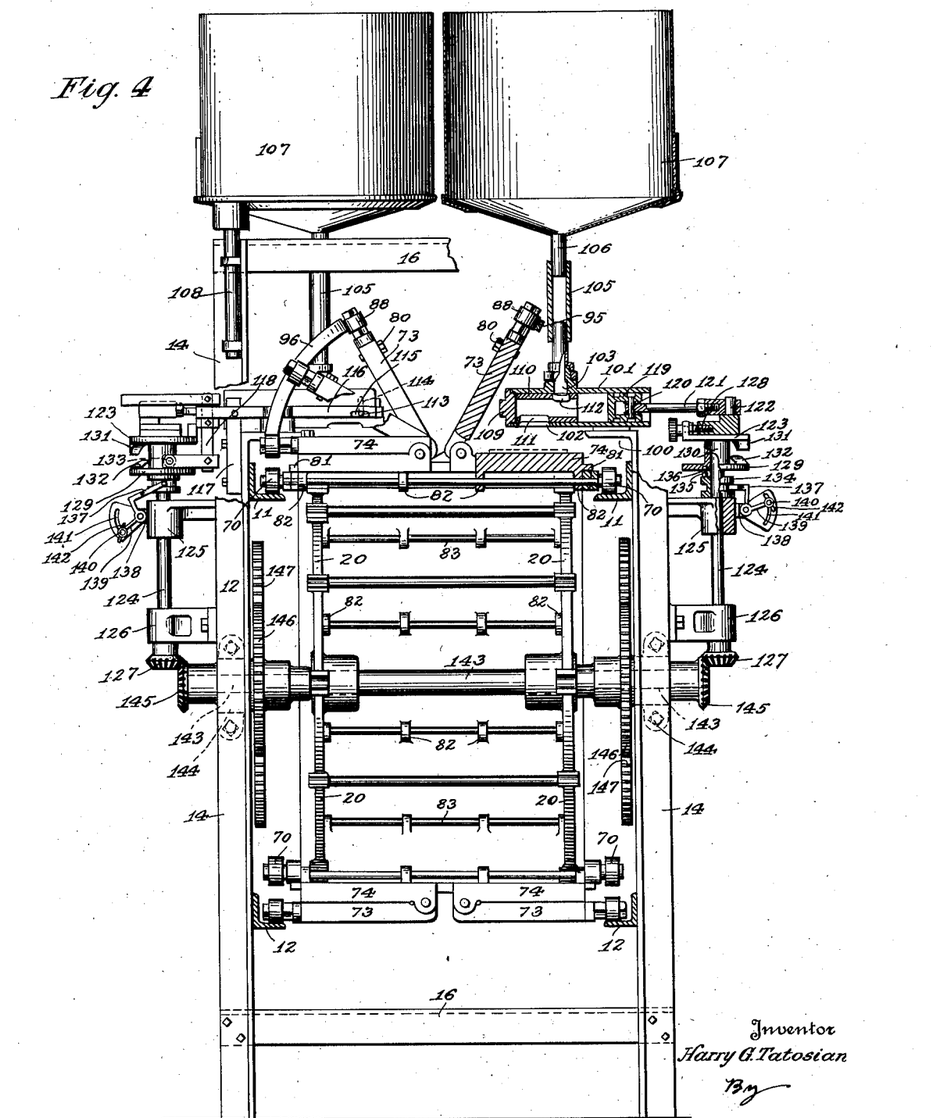
Fig. 4 is a vertical sectional view taken along line 4—4 of Fig. 3 and also showing the batter feed mechanism.

During the open period of the baking irons the baked cakes are removed and batter is thereupon supplied preparatory to the irons being again closed. The batter feed mechanism for the two rows of irons are provided in duplicate at each side of the machine and are identical in construction. They each comprise an angular base 100 secured on the bar 11 and supporting a cylindrical batter ejector 101 having an outlet 102 at its under side adjacent the inner end, and directly above the lower section 74 of an open baking iron in place therebeneath. An inlet opening 103 is provided at the upper side of the cylinder, and is connected by a short length of flexible tube 105 to the contracted outlet 106 of a batter supply tank 107, supported upon a bracket 108 secured to the upright 14.

A removable cap 109 is screwed into the inner end of the cylinder 101, and within the cylinder and adjacent said inner end there is provided a rotatable valve sleeve 110, having an outlet opening 111 adapted in one position of rotation to register with the outlet opening 102; and also provided with an inlet opening 112 adapted in the other position of rotation to register with the inlet opening 103, one of the openings of the valve sleeve being out of register while the other is in register. A finger 113 is provided upon the valve sleeve and projects through a slot 114 in the cylinder, its outer end being engaged in the slotted end 115 of a rock lever 116, pivotedly mounted upon a support 117 and adapted to be rocked to rotate the valve sleeve and thereby alternately open and close the inlet and outlet openings. The upper lever of the opening 116 is bent downwardly and outwardly as at 118.

A piston 119 is provided in the cylinder 101 and is connected by swivel joint 120 to one end of a connecting rod 121, the other end of which is connected to a pin 122 eccentrically mounted upon a disk 123, loosely rotatable upon the upper end of a vertical shaft 124 journaled in bearings 125 and 126, the shaft being provided at its lower end with a beveled gear 127. The eccentric pivot 122 is adjustable upon the disk 123 by means of a screw 128, so that the throw of the piston may be regulated as desired. The disk 123 has another disk 128 connected thereto in spaced relation by an integral hub 130; the inner sides of the two disks being provided with spaced cam projections 131 and 132, adapted to engage a roller 133 provided upon the bent end 118 of the lever 116, and disposed in the space between the disks, to thereby oscillate the lever and rotate the valve sleeve 110, the to and fro rotation of the valve sleeve alternately opening and closing the inlet and outlet openings. The simultaneous rotation of the eccentric pin 122 reciprocates the piston 119 in syncronism with the opening and closing of said inlet and outlet openings so that during the outward movement of the piston the openings 103 and 112 are in register and batter is drawn into the cylinder while the inward movement of outlet openings 112 and 111 are in register and the batter is ejected upon the lower section of the baking iron.

As before mentioned, the disk 123 is loosely rotatable on the shaft. In order to operatively connect it thereto a clutch is provided comprising an annularly channelled collar 134 keyed to the shaft and slidable thereon and provided with a pin 135 adapted to be engaged and disengaged with a hole 136 in the disk 129 in its respective raised and lowered position, the disk rotating with the shaft in the raised position. In order to raise and lower the cam 134, a yoke lever 137 is pivotally mounted on a bracket 138 secured to the bearings 125, its roller ends engaging the channel of the collar. The arm 139 of the yoke lever is provided with a wing bolt 140 engaging an arcuate slot 141 provided in an extension plate 142 of the bracket 138, and is adapted to secure the yoke lever in either its raised or lowered positions. This arrangement permits either of the batter feed mechanisms to be rendered inoperative at will.

The shaft 124 is driven by a stud shaft 143 journaled in a bearing 144 secured between the uprights 10 and 14, said shaft being provided at one end with a beveled gear 145 meshing with the beveled gear 127, and at its other end with a gear 146 meshing with a large gear 147 provided in the sprocket shaft 18. The shaft 124 is therefore continuously rotated during the movement of the conveyor.

As the irons are provided with batter they move into relation with the decline portions 96 of the cam rails and the upper sections 73 close upon the lower sections. As they move along the upper and lower reaches, they are heated to bake the cakes by means of gas tubes 148 and 149 having upwardly directed jets, the weight of the upper sections 73 being upon the cakes along the upper reach and while the gas jets are directed against the lower section 74, while the weight of the lower section 73 is upon the upper sections and upon the cakes therebetween, during the movement along the lower reach the gas jets being directed against the upper section. Complete and uniform baking of the cakes results. As the cakes are removed from the baking irons, they may be fed directly into a cone rolling machine, such for instance as the one disclosed in my U. S. Patent #1,440,851, and from which they emerge as cones (Fig. 9).

The machine may at all times be accurately regulated as to speed so that the proper baking time may be allowed for the cakes. Either of the batter feed mechanisms may be rendered inoperative at will, so that the baking of the cakes at one side may be stopped, while the baking may be continued at the other side. All parts of the machine are readily accessible, and any one of the baking irons may be removed in a unit, for the purpose of repair or replacement, without disturbing the others.

I have illustrated and described a preferred and satisfactory embodiment of my invention, but it is obvious that changes may be made therein within the spirit and scope thereof as defined in the appended claims.

Having thus described my invention, what I claim and desire to secure by Letters Patent is:—

1. In a machine of the character described, a continuous conveyor comprising parallel spaced shafts and links connecting the ends of said shafts, book-molds supported in the space between each pair of shafts and the connecting end links, heating means for heating said molds, cam means engaging the forward swinging ends of the upper section of said book-molds for opening and closing said molds at one point in the traverse of the conveyor and means for supplying batter to the molds during said open period.

2. In a machine of the character described, a continuous conveyor, a plurality of hinged book-molds carried thereby and arranged in a plurality of parallel rows, heating means for heating said molds, means for opening and closing the molds of each row simultaneously about their respective hinges at one point in the traverse of said conveyor and duplicate means for simultaneously supplying batter to the molds of each row during said open period.

3. In a machine of the character described, a continuous conveyor, a plurality of flat book-molds carried thereby and arranged in two similar and opposed rows, the hinges of said molds being adjacent, whereby the molds may be opened outwardly at each side of said conveyor, heating means for heating said molds, means for opening and closing said molds at one point in the traverse of the conveyor and duplicate means for simultaneously supplying batter to the molds of each row during said open period.

4. In a machine of the character described, a continuous conveyor comprising a plurality of hingedly connected link sections, a plurality of flat book-molds carried thereby and each comprising a lower flat section secured to the respective link sections of the conveyor independently of the adjacent mold and an upper flat section hinged at one end to said lower section and having a projecting roller at its other end, heating means for heating said molds, a cam adapted to engage said rollers to raise and lower said upper sections at one point in the traverse of the conveyor and means between the ends of said cam for supplying batter to the molds during said open period.

5. In a machine of the character described, a continuous conveyor comprising parallel spaced shafts and links connecting said shafts at their ends, a center rod between said shafts and removably connected at its ends to said links, flat book-molds between said shafts connected to said center rod and resting at one end upon said links, heating means for heating said molds, means for opening and closing said molds at one point in the traverse of the conveyor, and means for supplying batter to said molds during said open period.

6. In a machine of the character described, a continuous conveyor comprising parallel spaced shafts and links connecting said shafts at their ends, a center rod between said shafts and connected at its ends to said links, a pair of similar and opposed book-molds between said shafts, the lower section of said molds being connected to said center rod and resting upon said links, heating means for heating said molds, means for opening and closing said molds at one point in the traverse of the conveyor, and means for supplying batter to the molds during said open period.

7. In a machine of the character described, a frame, a pair of sprocket wheels at each end of said frame, upper and lower pairs of horizontal tracks extending between said sprockets, and substantially tangential thereto, a continuous conveyor extending over said sprocket wheels and said tracks, a plurality of book-molds independently and removably secured to said conveyor, heating means for heating said molds, means for opening and closing said molds at one point in the traverse of the conveyor, and means for supplying batter to the molds during said open period.

8. In a machine of the character described, a frame, a pair of sprocket wheels at each end of said frame, upper and lower pairs of parallel tracks extending between said sprocket wheels and substantially tangential thereto, a continuous conveyor extending over said sprocket wheels and said tracks, a plurality of book-molds independently and removably secured to said conveyor, the outer mold sections adapted to be maintained closed by gravity along the upper reach of the conveyor and adapted to engage said lower tracks to maintain them closed along the lower reach of the conveyor, heating means for heating said molds, means adapted to open and close said molds at one point in the traverse of the conveyor, and means for supplying batter to the molds during said open period.

9. In a machine of the character described, a frame, a pair of sprocket wheels at each end of said frame, upper and lower pairs of parallel tracks extending between said sprocket and substantially tangential thereto, a continuous conveyor extending over said sprocket wheels and said tracks and comprising parallel spaced shafts having rollers at their ends adapted to engage said upper tracks, book-molds supported between each pair of shafts and comprising a lower section secured to said conveyor independently of the adjacent molds and an upper section hinged to said lower section at one end and provided at its other end with a roller adapted to engage said lower tracks, said upper section adapted to be maintained closed by gravity along the upper reach of the conveyor, heating means adapted to heat said molds, means for opening and closing said molds at one point in the traverse of said conveyor, and means for supplying batter to said molds during said open period.

10. In a machine of the character described, a frame, a pair of sprocket wheels at each end of said frame, upper and lower pairs of parallel tracks extending between said sprocket wheels and substantially tangential thereto, a continuous conveyor extending over said sprocket wheels and comprising parallel spaced shafts having rollers at their ends adapted to engage said upper tracks and links connecting said shafts adjacent their ends, pairs of similar and opposed book-molds carried by said conveyor and comprising lower sections secured to said conveyor independently of the adjacent molds and upper sections hinged to said lower sections at their inner ends and provided at their outer ends with rollers, said upper sections adapted to be maintained closed by gravity along the upper reach of the conveyor and by engagement of said rollers to said upper sections with said lower tracks along the lower reach of said conveyor, heating means for heating said molds, means for opening and closing the molds and means for supplying batter to said molds during said open period.

11. In a machine of the character described, a continuous conveyor, means for driving said conveyor, a plurality of rows of book-molds carried by said conveyor, heating means for heating said molds, means for opening and closing said molds, a plurality of intermittently operating means for supplying batter to said respective rows of molds successively during said open period and each comprising a batter tank, a cylindrical ejector having an inlet opening connected to said tank and an outlet opening disposed above said molds, a valve adapted to be operated to successively open and close said inlet and outlet openings, a piston in said cylinder adapted to be reciprocated outwardly during the open period of the inlet opening and inwardly during the open period of the outlet opening to draw batter into and eject it from said cylinder, and rotary means for reciprocating said piston and operating said valve, a shaft adapted to be rotated by the movement of the conveyor, and clutch means between said rotary means of each batter supplying means and said shaft adapted to be operated to connect and disconnect them at will.

12. In a machine of the character described, a continuous conveyor, a plurality of book-molds carried thereby and arranged in a plurality of rows, heating means for heating said molds, means for opening and closing said molds at one point in the traverse of the conveyor, and duplicate means for simultaneously supplying batter to the molds of each row during said open period, means adapted to be driven by the movement of the conveyor for driving said batter supplying means, and individual clutch means between said drive means and the batter supplying means adapted to be operated to connect and disconnect them individually at will.

Signed at Bridgeport, in the county of Fairfield and State of Connecticut, this 29th day of May, A. D. 1923.

HARRY G. TATOSIAN.

Witnesses:
C. M. NEWMAN,
MARTIN TATOSIAN.